United States Patent [19]
Rubens et al.

[11] 3,798,836
[45] Mar. 26, 1974

[54] A HYDROPONIC BED FOR GROWING PLANTS

[75] Inventors: Louis C. Rubens, Midland; Donald H. Clarke, Essexville, both of Mich.

[73] Assignee: The Dow Chemical Company, Midland, Mich.

[22] Filed: Dec. 4, 1972

[21] Appl. No.: 311,457

[52] U.S. Cl.................. 47/1.2, 47/37, 47/DIG. 7, 47/56, 260/2.5, 260/2.5 A, 260/DIG. 43, 71/64 C
[51] Int. Cl............................................. A01g 31/00
[58] Field of Search......... 47/1.2, 37, 56, 58, 34.13, 47/DIG. 7; 260/2.5, 2.5 A, DIG. 43; 71/64 C

[56] References Cited
UNITED STATES PATENTS

| | | | |
|---|---|---|---|
| 2,965,584 | 12/1960 | Elkin | 260/2.5 |
| 2,988,441 | 6/1961 | Pruitt | 47/DIG. 7 |
| 3,110,129 | 11/1963 | Baumann | 47/58 |
| 3,257,754 | 6/1966 | Ohsol | 47/56 |
| 3,608,238 | 9/1971 | Reuter | 47/1.2 |
| 3,703,786 | 11/1972 | Swan | 47/56 |
| 3,706,678 | 12/1972 | Dietrich et al. | 47/DIG. 7 |

FOREIGN PATENTS OR APPLICATIONS

| | | | |
|---|---|---|---|
| 722,589 | 11/1965 | Canada | 47/DIG. 7 |
| 2,041,192 | 3/1971 | Germany | 47/37 |
| 7,016,162 | 5/1971 | Netherlands | 47/37 |

*Primary Examiner*—Robert E. Bagwill
*Attorney, Agent, or Firm*—H. L. Aamoth

[57] ABSTRACT

A novel hydroponic bed is disclosed comprising an aqueous nutrient solution and floating thereon a composite foam plant growth medium composed of a water insoluble open celled foamed polyurethane matrix having dispersed therein expanded cellular thermoplastic particles and a small amount of a water swellable, cross-linked hydrophilic polymer.

5 Claims, No Drawings

A HYDROPONIC BED FOR GROWING PLANTS

BACKGROUND OF THE INVENTION

The field of this invention relates to plant growth media and particularly to hydroponic plant growth beds.

Hydroponics evolved from early studies of the effect of nutrients on plant growth wherein the plant roots were immersed in water. To provide better plant root support the process was modified to employ an inert medium such as gravel, fused shale or clay, granite chips, slag and the like to support the plant while its roots were exposed to nutrient solutions.

Much study has also been directed towards soil nutrients and means of controlling or supplementing them. U. S. Pat. No. 3,082,074 describes the admixture of ion exchange resins in certain nutrient forms with various soils and the advantages thereof. This work was extended to the incorporation of the ion exchange beads in an open celled polymer foam for potted plants in U. S. Pat. No. 2,988,441. U. S. Pat. No. 3,373,009 further describes the addition of leach resistant nutrient salts to a similar foam for use with potted plants. All the above methods provide the nutrients in a solid form and are to be contrased to hydroponic systems where the nutrients are in a soluble form which is continuously recycled to the hydroponic bed. Hydroponics also has the advantage of being able to continuously adjust the strength of the nutrient at various stages of plant growth and to the addition of additional nutrients, e.g. ferrous sulfate etc. at judicious periods in the growth period of the plant.

SUMMARY OF THE INVENTION

The present invention provides an improved support for the growth of the plant and utilizes the advantages of the hydroponic nutrient solutions to continuously provide a proper balance of nutrients to maximize plant growth and crop yield.

Advantageously this invention employs a composite foam plant growth medium to support plants grown hydroponically. Said foam comprises from about 60 to 90 weight percent of s stable, open-celled, water insoluble polyurethane foam matrix having intimately dispersed therein about 40 to 10 weight percent of expanded cellular thermoplastic particles and about 0.1 to 5 weight percent of a water swellable, cross-linked hydrophilic polymer. The expanded cellular thermoplastic particles provide additional buoyancy to the composite foam and load support.

The water swellable polymer imbibes water so that plant seeds inserted in the composite foam are provided with water and necessary nutrients for germination and growth. As the plant grows its roots grow through the foam and extend into the nutrient solution. The open cells of the matrix provide paths for air to reach the plant roots. The overall combination of components provides a novel, reliable improvement to hydroponic growing of plants.

DESCRIPTION OF THE INVENTION

Hydroponic methods of growing plants are well known and are described in numerous books, technical articles, encyclopedias and the like, e.g. see Encyclopedia Britanica or McGraw-Hill Encyclopedia of Science and Technology. Briefly, an inert medium such as gravel is used to support the plant and the nutrients are supplied by covering the gravel layer with an aqueous nutrient solution which is recirculated and which may be altered in strength or composition throughout the growth period.

Many mineral salt combinations are known which supply principally phosphorous, potassium and nitrogen although many other elements may also be present such as iron, zinc, copper, manganese, magnesium, calcium and the like. Many of these metals are used in their soluble salt forms or may be solubilized by chelating agents.

A typical nutrient solution proposed for florist crops contains the following.

| potassium nitrate | 5 lb. 13.oz/100 gallons |
| ammonium sulfate | 1 lb. (do) |
| magnesium sulfate | 4 lb. 8 oz. (do) |
| monocalcium phosphate | 5 lb. (do) |

Another typical nutrient solution contains the following:

| | $\mu$moles/liter |
| --- | --- |
| $KNO_3$ | 7000 |
| $Ca(NO_3)_2 \cdot 4H_2O$ | 3000 |
| $Mg\,SO_4 \cdot 7H_2O$ | 1000 |
| $NH_4H_2PO_4$ | 1000 |

Many other solutions may be prepared which may also include one or more salts such as $KCl$, $MnSO_4 \cdot H_2O$, $FeSO_4 \cdot 7H_2O$ and the like. Because of the well known nature of hydroponic plant growth no further description is believed necessary.

The composite foam plant growth medium comprises three principal components: 1) a stable, water insoluble, open-celled foamed polyurethane matrix 2) expanded cellular thermoplastic particles intimately dispersed in said matrix and 3) a small amount of a water swellable, crosslinked hydrophilic polymer uniformly distributed therein. The proportions of each component may be varied within the range of about 60 to 90 weight percent of said matrix, about 40 to 10 weight percent of said thermoplastic particle and about 0.1 to 5 weight percent of said hydrophilic polymer.

Among the advantages of this invention are: the composite foam provides support for the plant growing therein, the nutrient solution may be varied in strength or supplemented as needed, the open cells of the matrix provide access paths for air to reach the plant roots, the water swellable polymer imbibes nutrient solution and furnishes it to the plant, the composite foam is light and easily handled, the composite foam may be steam sterilized between crop plantings if necessary and the composite foam is inert and does not affect the pH of the nutrient solution.

In the preferred embodiment of the invention the composite foam is prepared by mixing the water swellable, crosslinked polymer and expandable thermoplastic particles containing a blowing agent therein with polyurethane precursors which react exothermally to produce the composite foam. Advantageously, the exotherm provides the heat to expand the thermoplastic particles. The preparation of composite foams, sans said water swellable polymer, is disclosed in U. S. Pat. No. 2,959,508, U. S. Pat. No. 3,607,797 and U. S. Pat. No. 3,277,026 which are incorporated herein by reference.

Any of the well known polyurethane precursors and methods of making said foams may be employed herein. The basic precursors are a polyester or a polyol and a diisocyanate which are reacted together in the presence of a catalyst and water and/or an auxiliary blowing agent. Various modifying agents may also be present.

Polyesters such as the condensation product of diethylene glycol and adipic acid may be employed but it is preferred to use polyols which may be diols, triols and higher functional polyols. Typical polyols include polybutylene glycol, polypropylene glycol, polyethylene glycols, polyoxyalkylene triol adducts of glycerol, polyoxyalkylene octol adducts of sucrose, polyoxyalkylene hexol adducts of sorbitol and the like.

Isocyanates most widely used are toluene diisocyanate (usually on 80/20 mixture of the 2,4- and the 2,6- isomers), isomeric phenylene diisocyanates such as the ortho or meta isomers, 4,4'-methylenebis (phenyl isocyanate), and several polymeric isocyanates such as polymeric methylenedianiline diisocyanate (MDI) and polymethylenepolyphenyl isocyanate.

Catalysts include tertiary amines such as N-methylmorpholine, diethylethanol amine, triethylene diamine and the like or metal organic acid salts such as stannous octoate. Water produces $CO_2$ which acts as a blowing agent. Other auxiliary blowing agents may be used alone or in combination with water, e.g. fluorotrichloromethane (Freon 11) and other halogenated hydrocarbons. Silicones or surfactants may also be used to control cell size. Crosslinking may be obtained by using higher functional polyols and by the addition of other polyfunctional reactants. Water also contributes to branching and crosslinking.

The formation and expansion of the urethane polymer into a foam may take place simultaneously as in the "one-shot" technique or the urethane polymer may be partially formed prior to expansion as in the "prepolymer" method. In the latter the diisocyanate and polyol (or polyester) are reacted in the absence of water and a catalyst to form a prepolymer containing an excess of unreacted isocyanate groups. Foaming may then be carried out at a later time by the addition of water, catalysts and surfactants. The "one-shot" method involves the simultaneous addition of diisocyanate, polyol, catalyst, water, surfactant, etc. to a reaction zone where they are intimately mixed with foaming occurring within seconds. In this invention the water swellable crosslinked polymer and expandable thermoplastic particles are either added to the prepolymer or simultaneously combined with all the reactants (one-shot) to produce the composite foam. The composite may be post-heated to insure full expansion of the thermally expandable particles. Exposure of the foam to high frequency electrical energy may alternately be used to post heat the composite foam.

By stable it is meant that the foam retains its physical foam structure over extended and repeated periods of use and is water insoluble. By open celled is meant that at least a part of the foam is open-celled, i.e., must have interconnecting cells. Although a highly open-celled foam is preferred, the foam matrix should have at least about 20 percent open-celled structure to permit unhindered root growth and imbibation of nutrient solution by the swellable, crosslinked polymer contained therein.

Any expandable thermoplastic particle capable of thermal expansion to low density cellular particles may be used. By expandable is meant said particle contains a blowing agent therein such as a volatile liquid which is a poor solvent or nonsolvent for the thermoplastic or a solid organic or inorganic material which decomposes thermally to produce a gas or vapor. Low boiling hydrocarbons (e.g. mixture of pentane isomers), halogenated hydrocarbons such as dichlorodifluoromethane and the like may be used. The normal preferred temperature range for thermal expansion of said particles is about 100° to 200° C. However, the upper limit is controlled by the temperature at which the particle collapses and the lower limit being the temperature at which expansion occurs.

The preparation of expandable thermoplastic particles is disclosed in U. S. Pat. No. 2,848,428. Typical of said particles are those prepared from vinyl aromatic monomers such as styrene, vinyl toluene, alkyl substituted styrenes such as t-butyl styrene, halogenated styrenes such as chlorostyrene, and the like or mixtures thereof. Said particles may be uncrosslinked or lightly crosslinked particles. Conveniently, divinyl benzene and like polyvinyl monomers may be copolymerized to produce lightly crosslinked particles as is disclosed in U. S. Pat. No. 2,848,428. The invention is not limited to polystyrene but includes all manner of expandable thermoplastic particles such as the homopolymers and copolymers of olefinic monomers (ethylene, propylene and higher olefins), alkenyl aromatic monomers (styrene, vinyl toluene and the like), acrylate and methacrylate esters such as methyl methacrylate and the like, vinyl chloride, vinylidene chloride, etc. Typical thermoplastics include polymethyl methacrylate, polyvinyl chloride, saran copolymers, polyethylene and the like. Polysulfones such as copolymers of an olefin such as butene and $SO_2$ are also useful thermoplastics.

Thermal expansion produces for the most part individual closed, thin walled cellular particles which may have been expanded from about 10 to 100 times higher than their original volume.

The water swellable, crosslinked hydrophilic polymer may be any crosslinked organic polymer whose linear analog is water soluble. Also included are those crosslinked polymers which may be chemically modified to have a water swellable group, e.g. partial sulfonation and neutralization of crosslinked polystyrene introduces sulfonate salt groups.

Crosslinking is conveniently obtained by polymerizing the monomer or monomer mixture with a copolymerizable divinyl or polyvinyl compound, such as divinyl benzene, N,N'-methylene bisacrylamide, ethylene glycol diacrylate ester and the like. It is usually sufficient to use about 0.05 to 1.5 mole percent of a polyvinyl crosslinking monomer. Higher amounts may be used but the extent of swelling generally decreases as the degree of crosslinking increases.

Ionizing radiation may also be used to crosslink said polymers. Crosslinked polyacrylate salts obtained in this manner are disclosed in U. S. Pat. No. 3,090,736. Chemical reactions between a polyfunctional compound and reactive groups on the polymer may also be used to obtain crosslinking, e.g. an anhydride containing polymer may be lightly crosslinked by reacting a diamine with a portion of the anhydride groups and the remaining anhydride groups can then be hydrolyzed or converted to various salt groups.

In addition to the crosslinked polymers already mentioned other materials which may be used are crosslinked polymethacrylic acid, polysulfoethyl acrylic and methacrylic acids, poly N-vinyl pyrrolidone, polyglycols, polysodium styrene sulfonate, sulfonated polystyrene and polyvinyltoluene, copolymers of said sulfonated alkaryl and aromatic materials with acrylonitrile or acrylates, polyvinyl alcohol, polyacrylamide, copolymers of acrylamide and acrylate or methacrylates, poly N-vinyl morpholinone, carboxy methyl cellulose, and the like. Crosslinked natural polymers such as casein, gellatin and a variety of polysaccharides may also be used. A group of N-vinyl heterocyclic nitrogen polymers useful herein is disclosed in U. S. Pat. No. 3,575,881.

A preferred class is the crosslinked polyacrylamide polymers and copolymers which contain carboxylic acid groups formed either by partial hydrolysis of the amide groups or by direct copolymerizations of acrylamide with acrylic acid, methacrylic acid or the like. Crosslinking is obtained, preferably, by employing about 0.1 to 10 weight percent of methylene bisacrylamide, preferably 0.5 to 2 percent, in the preparation of the polymer. The amount of carboxylic acid may vary from 0 up to 40 mole percent, preferably about 10 to 30 mole percent.

A composite foam was made from the following components: 100 parts of a polypropylene triol polyether having a molecular weight of 3,000 (Dow Voranol CP 3000), 3 parts of water, 1.4 parts of silicone, 2 parts of a 33 percent solution of triethylene diamine in a glycol (Dabco 33LV, Houdry Chemical), 0.6 part of stannous octoate, 5 parts of a crosslinked polyacrylamide (1,500–1,800 ppm of methylene bisacrylamide) hydrolyzed to 25–35 percent carboxylate and 25 parts of crosslinked, espandable polystyrene beads (6.5 wt. percent isopentane expansion agent; 0.04 percent divinylbenzene crosslinking monomer).

All the above ingredients were mixed together and then 39 parts of toluene diisocyanate were added and mixed. The mixture foamed and formed a composite structure in which the exotherm caused the expandable beads to expand to a low density cellular material. The composite foam was allowed to cure for several hours at room temperature.

The composite foam was then cut into one inch thick slabs and used to grow bean plants by the hydroponic method. A razor blade was used to cut a slit in the foam into which a bean seed was inserted (Green bush stringbean, Landreth's, from Ferry-Morse). The composite foam seed bed was floated on a nutrient solution in a large pan and the bean plants were grown outdoors. The nutrient solution comprised one tablespoon per gallon of water of a liquid plant food ("Plant Marvel," 12-31-14, from Plant Marvel Laboratories, Chicago, Ill.). Water was added regularly and occasionally additional nutrient was added with the water. The seeds germinated, grew to full size and produced a green bean crop.

It will be understood that the present invention is not limited to the specific details described above but may embody various modifications insofar as they are defined in the following claims.

What is claimed is:

1. A composite foam plant growth medium suitable for hydroponic plant growth comprising about 60 to 90 weight percent of a stable, water insoluble, opencelled foamed polyurethane matrix having intimately dispersed therein about 40 to 10 weight percent of expanded cellular thermoplastic particles and about 0.1 to 5 weight percent of a water swellable crosslinked hydrophilic polymer.

2. A hydroponic bed comprising an aqueous nutrient solution in intimate contact with a composite foam plant growth medium according to claim 1.

3. A composite foam according to claim 1 wherein said thermoplastic is polystyrene and said hydrophilic polymer is a partially hydrolyzed polyacrylamide.

4. In a process for hydroponically growing plants wherein a plant is supported so that its roots are immersed in an aqueous nutrient solution, the improvement which comprises supporting said plant in a composite foam plant growth medium wherein said composite foam comprises about 60 to 90 weight percent of a stable, water insoluble, open-celled foamed polyurethane matrix having intimately dispersed therein about 40 to 10 weight percent of expanded cellular thermoplastic particles and about 0.1 to 5 weight percent of a water swellable crosslinked hydrophilic polymer.

5. A process according to claim 4 wherein said thermoplastic is polystyrene and said hydrophilic polymer is a partially hydrolyzed polyacrylamide.

* * * * *